United States Patent
Harvey et al.

(10) Patent No.: US 12,361,291 B2
(45) Date of Patent: *Jul. 15, 2025

(54) CONTROL SEQUENCE GENERATION SYSTEM AND METHODS

(71) Applicant: PassiveLogic, Inc., Holladay, UT (US)

(72) Inventors: Troy Aaron Harvey, Brighton, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,627

(22) Filed: Sep. 14, 2023

(65) Prior Publication Data
US 2024/0005168 A1  Jan. 4, 2024

Related U.S. Application Data

(63) Continuation of application No. 17/193,179, filed on Mar. 5, 2021, now Pat. No. 11,861,502.
(Continued)

(51) Int. Cl.
*G06N 3/084* (2023.01)
*B60H 1/00* (2006.01)
(Continued)

(52) U.S. Cl.
CPC ......... *G06N 3/084* (2013.01); *B60H 1/00285* (2013.01); *F24F 11/64* (2018.01);
(Continued)

(58) Field of Classification Search
CPC .. F24F 11/46; F24F 11/63; F24F 11/64; F24F 11/65; F24F 2110/10; F24F 11/30;
(Continued)

(56) References Cited

U.S. PATENT DOCUMENTS 5,224,648 A  7/1993  Simon et al.
5,581,659 A  12/1996  Takatori
(Continued)

OTHER PUBLICATIONS

An et al., "IC neuron: An efficient unit to construct neural netoworks". (Year:2020).
(Continued)

*Primary Examiner* — Darrin D Dunn

(57) ABSTRACT

Various embodiments described herein relate to a method, device, and non-transitory machine-readable storage medium for controlling a system having a plurality of devices including one or more of the following: calculating a demand curve for a controlled space representing at least one target amount of state for delivery to the controlled space; creating a cost function that compares the demand curve to simulated state curves produced by a model of the controlled system based on respective sets of control actions issuable to the plurality of controlled devices; performing an optimization method that tunes a candidate set of control actions to reduce a cost output by the cost function based on the candidate set of control actions; and issuing control actions of the candidate set of control actions to respective ones of the plurality of controlled devices to cause the controlled system to deliver state to the controlled space.

20 Claims, 8 Drawing Sheets

Related U.S. Application Data

(60) Provisional application No. 62/704,976, filed on Jun. 5, 2020.

(51) Int. Cl.

| | | |
|---|---|---|
| F24F 11/64 | (2018.01) | |
| F24F 11/65 | (2018.01) | |
| G05B 13/02 | (2006.01) | |
| G05B 13/04 | (2006.01) | |
| G05B 19/042 | (2006.01) | |
| G06F 17/16 | (2006.01) | |
| G06F 30/18 | (2020.01) | |
| G06F 30/27 | (2020.01) | |
| G06N 3/04 | (2023.01) | |
| G06N 3/047 | (2023.01) | |
| G06N 3/048 | (2023.01) | |
| G06N 3/063 | (2023.01) | |
| G06N 3/08 | (2023.01) | |
| G06Q 10/067 | (2023.01) | |
| G06Q 50/163 | (2024.01) | |
| F24F 120/10 | (2018.01) | |
| F24F 120/20 | (2018.01) | |
| F24F 140/50 | (2018.01) | |
| G06F 119/06 | (2020.01) | |
| G06F 119/08 | (2020.01) | |

(52) U.S. Cl.
CPC ............ *F24F 11/65* (2018.01); *G05B 13/027* (2013.01); *G05B 13/04* (2013.01); *G05B 19/042* (2013.01); *G06F 17/16* (2013.01); *G06F 30/18* (2020.01); *G06F 30/27* (2020.01); *G06N 3/04* (2013.01); *G06N 3/047* (2023.01); *G06N 3/048* (2023.01); *G06N 3/063* (2013.01); *G06N 3/08* (2013.01); *G06Q 10/067* (2013.01); *G06Q 50/163* (2013.01); *F24F 2120/10* (2018.01); *F24F 2120/20* (2018.01); *F24F 2140/50* (2018.01); *G05B 2219/2614* (2013.01); *G06F 2119/06* (2020.01); *G06F 2119/08* (2020.01)

(58) Field of Classification Search
CPC ............... F24F 2120/00; F24F 2120/10; F24F 2130/00; F24F 2120/20; F24F 2140/50; G05B 15/02; G05B 13/048; G05B 13/027; G05B 2219/2614; G05B 17/02; G05B 19/042; G05B 2219/2642; G06N 20/00; G06N 3/045; G06N 3/08; G06N 3/084

See application file for complete search history.

(56) References Cited

U.S. PATENT DOCUMENTS

| | | | |
|---|---|---|---|
| 6,119,125 | A | 9/2000 | Gloudeman et al. |
| 6,128,609 | A * | 10/2000 | Rose ........................ G06N 3/08 706/23 |
| 6,967,565 | B2 | 11/2005 | Lingemann |
| 7,447,664 | B2 | 11/2008 | Pado |
| 7,756,804 | B2 | 7/2010 | Bloom et al. |
| 9,020,647 | B2 | 4/2015 | Johnson et al. |
| 9,258,201 | B2 | 2/2016 | McCoy et al. |
| 9,298,197 | B2 | 3/2016 | Matsuoka et al. |
| 9,557,750 | B2 | 1/2017 | Gust et al. |
| 9,664,400 | B2 | 5/2017 | Wroblewski et al. |
| 9,857,238 | B2 | 1/2018 | Malhotra et al. |
| 10,013,644 | B2 | 7/2018 | Takahashi |
| 10,094,586 | B2 | 10/2018 | Pavlovski et al. |
| 10,140,544 | B1 | 11/2018 | Zhao et al. |
| 10,845,815 | B2 | 11/2020 | Palanisamy et al. |
| 11,908,573 | B1 * | 2/2024 | Forehand ............... G16H 40/20 |
| 2002/0152298 | A1 | 10/2002 | Kikta et al. |
| 2008/0082183 | A1 | 4/2008 | Judge |
| 2008/0277486 | A1 | 11/2008 | Seem et al. |
| 2010/0025483 | A1 | 2/2010 | Hoeynck et al. |
| 2012/0084231 | A1 | 4/2012 | McNaught et al. |
| 2014/0277757 | A1 | 9/2014 | Wang et al. |
| 2015/0300892 | A1 | 10/2015 | Malhotra et al. |
| 2016/0201934 | A1 * | 7/2016 | Hester ..................... F24F 11/89 700/276 |
| 2016/0313752 | A1 | 10/2016 | Przybylski |
| 2017/0091615 | A1 | 3/2017 | Liu et al. |
| 2017/0322579 | A1 | 11/2017 | Goparaju et al. |
| 2018/0202678 | A1 | 7/2018 | Ahuja et al. |
| 2018/0266716 | A1 | 9/2018 | Bender et al. |
| 2018/0365558 | A1 | 12/2018 | Sekiyama et al. |
| 2019/0018067 | A1 | 1/2019 | Kong et al. |
| 2019/0219293 | A1 | 7/2019 | Wenzel et al. |
| 2019/0360711 | A1 | 11/2019 | Sohn et al. |
| 2019/0377306 | A1 * | 12/2019 | Harvey ............... G05B 13/027 |
| 2020/0196973 | A1 | 6/2020 | Zhou et al. |
| 2020/0355391 | A1 | 11/2020 | Wenzel et al. |
| 2021/0081761 | A1 * | 3/2021 | Baker .................... G06N 3/045 |
| 2021/0182660 | A1 | 6/2021 | Amirguliyev et al. |
| 2021/0191342 | A1 | 6/2021 | Lee et al. |
| 2021/0285671 | A1 * | 9/2021 | Du .......................... F24F 11/65 |
| 2021/0286688 | A1 * | 9/2021 | Liu ..................... G06F 11/1476 |
| 2023/0034809 | A1 | 2/2023 | Lee et al. |

OTHER PUBLICATIONS

Huang, et al., (Reachnn: Reachability analysis of neural-network controlled systems. ACM Transactions on Embedded Computing Systems (TECS) 18.5s (2019): 1-22) (Year:2019).

Biswas et a.l ("Prediction of residential building energy consumption: A neural network approach" Energy 17 (2016) 84-92.) (Year: 2016).

Afroz, Zakia, et al. "Real-time prediction model for indoor temperature ni a commercial building." Applied energy 231 (2018): 29-53. (Year: 2018).

Elsheikh AH, Sharshir SW, Abd Elaziz M, Kabeel AE, Guilan W, Haiou Z. Modeling of solar energy systems using artificial neural network: Acomprehensive review. Solar Energy. Mar. 1, 2019;180:622-39. (Year: 2019).

ANSI/ASHRAE Standard 55-2013: Thermal Environmental Conditions for Human Occupancy, ASHRAE, 2013.

De Dear, et at., "Developing an Adaptive Model of Thermal Comfort and Preference," ASHRAE Transactions 1998, vol. 104, Part 1.

Ferguson and Green, Deeply Learning Derivatives, arXiv:1809. 02233, Oct. 14, 2018.

Gagge, et al., A Standard Predictive index of Human Response to the Thermal Environment, ASHRAE Transactions 1986, Part 2B.

Guo, BackPropagation Through Time, 2013.

Hatcher, John, "Smart Buildings get hyperaware", Smart Buildings Magazine, Aug. 24, 2020.

Jang et al., Deep neural networks with a set of node-wise varying activation functions, Neural Networks 126 (2020) 118-131.

Medhi, et al., Jan. 2011, "Model-Based Hierarchical Optimal Control Design for HVAC Systems," ASME 2011 Dynamic Systems and Control Conference and Bath/ASME Symposium on Fluid Power and Motion Control.

Mostafa et al., A Continuous-Time Recurrent Neural Network for Joint Equalization and Decoding—Analog Hardware Implementation Aspects, 2015, Ottawa University.

Nakahara, "Study and Practice on HVAC System Commissioning," The 4th international Symposium on HVAC, Beijing, China, Oct. 9-11, 2003.

Nassif et al., "Self-tuning dynamic models of HVAC system components," 2008, Elsiever, Energy and Buildings 40, 1709-1720.

Nassif, Nabil, (2005), Optimization of HVAC control system strategy using two-objective genetic algorithm [microform].

Perra, et al., "Monitoring Indoor People Presence in Buildings Using Low-Cost Infrared Sensor Array in Doorways," Sensors (Basel). Jun. 2021; 21(12): 4062.

(56) References Cited

OTHER PUBLICATIONS

Qin et al., "Commissioning and Diagnosis of VAV Air-Conditioning Systems," Proceedings of the Sixth International Conference for Enhanced Building Operations, Shenzhen, China, Nov. 6-9, 2006.
Zhang et al., "Building HVAC Scheduling Using Reinforcement Learning via Neural Network Based Model Approximation", BuildSys '19, pp. 287-296 (Year: 2019).
Rao, C++ Neural Networks and Fuzzy Logic, Jun. 1, 1995, MT Books, IDG Books Worldwide, Ind.
Rios, at al., "Derivative-free optimization: a review of algorithms and comparison of software implementations", J Glob Optimizers (2013) 56;1247-1293.
Sabor, et al., "Dynamic Routing Between Capsules," NIPS'17: Proceedings of the 31st International Conference on Neural Information Processing Systems, Dec. 2017, pp. 3859-3869.
Salsbury et al., "Automated Testing of HVAC Systems for Commissioning," Laurence Livermore National Laboratory, 1999, LBNL-43639.
Serale G., et al., Model Predictive Control (MPC) for Enhancing Building and HVAC System Energy Efficiency: Problem Formulation, Applications and Opportunities, Energies 2018, 11, 631; doi:10.3390, Mar. 12, 2018.
Sharma et al., Activation Functions in Neural Networks, Intentional Journal of Engineering Applied Sciences and Technology, 2020.
Sibi P., Analysis of Different Activation Functions Using Back-Propagation Neural Networks, Journal of Theoretical and Applied Information Technology, vol. 47. No. 3., Jan. 31, 2013.
Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net/1969 .1 /5060.
Vanus et al., The design of an indirect method for the human presence monitoring in the intelligent building, Human-centric Computing and Information Sciences 8, Article No. 28 (2018).
Xiao et al., "Automatic Continuous Commissioning of Measurement Instruments in Air Handling Units," Building Commissioning for Energy Efficiency and Comfort, 2006, vol. VI-1-3, Shenzhen, China.
Welsh, "Ongoing Commissioning (OCx) with BAS and Data Loggers," National Conference on Building Commissioning: Jun. 3-5, 2009.

\* cited by examiner

CONTROL SEQUENCE GENERATION SYSTEM AND METHODS

RELATED APPLICATIONS

The present application is a continuation of U.S. patent application Ser. No. 17/193,179, filed on Mar. 5, 2021, which claims priority to U.S. provisional patent application Ser. No. 62/704,976 filed Jun. 5, 2020, the entire disclosures of which are hereby incorporated herein by reference.

The present application hereby incorporates by reference U.S. utility patent application Ser. No. 17/009,713, filed Sep. 1, 2020.

FIELD

The present disclosure relates to neural network methods for determining building state needs. More specifically the present disclosure discusses generating control sequences when given zone state loads.

BACKGROUND

Structures need to have their states modified to meet the needs of the people or objects in the structure. For example, instruments may need to have specific humidity and temperature levels to avoid damage, and we all know how miserable it is to be in a too-hot or too-cold building. However, it is a daunting problem to attempt to keep a building at a desired state or move it to a new one due to the complex interaction between the building and the outside world, the people in the building, and the uneven heating (as a state example) provided by equipment.

SUMMARY

This summary is provided to introduce a selection of concepts in a simplified form that are further described below in the Detailed Description section. This summary does not identify required or essential features of the claimed subject matter.

In embodiments, a control sequence generation system implemented by one or more computers is disclosed, comprising: a time series control sequence that comprises instructions to control the controllable device over time; a target demand curve that comprises amount of state in a location over time; a thermodynamic model comprised of a thermodynamic representation of at least one controllable device; a computing engine that runs the thermodynamic model using the time series control sequence as input, and outputs a simulated demand curve; a cost function determiner that compares difference between the simulated demand curve and the target demand curve producing a cost; a new model input determiner that uses the cost to create a next time series control sequence; an iterator, which iteratively runs the computing engine using the next time series control sequence as input, the cost function determiner and the new model input determiner until a stop state is reached; wherein when the stop state is reached, the next time series control sequence becomes the control sequence generated.

In embodiments, the cost function determiner comprises a cost function which comprises a next time series control sequence of operation error, a next time series output path error, an energy cost, a state cost, a short cycling frequency, a frequency of sequence changes, a equipment life cost, or a comfort value.

In embodiments, the thermodynamic model is a heterogenous physics network.

In embodiments, the heterogenous physics network comprises nodes that comprise equations that model thermodynamic behavior of equipment.

In embodiments, the nodes are laid out with reference to the physical equipment behavior.

In embodiments, at least one node has multiple variables associated with it.

In embodiments, at least two nodes have different activation functions.

In embodiments, at least one activation function comprises multiple equations.

In embodiments, the new model input determiner further comprises a backpropagator that determines a gradient of values in nodes of the thermodynamic model in relation to the cost.

In embodiments, the backpropagator taking the gradient of the thermodynamic model backward using automatic differentiation.

In embodiments, the new model input determiner further comprises an optimizer that uses the gradient of values to produce a next time series control sequence; the control sequence generated is used to control at least one controllable device.

In embodiments, a node within the the thermodynamic model accepts a time series curve representing weather as input.

In embodiments, a method of control sequence generation implemented by one or more computers is disclosed, comprising: receiving a neural network of a plurality of controlled devices; receiving a desired demand curve; receiving a simulated control sequence that comprises instructions to control the controllable device over time for at least one of the plurality of controlled building zones; performing a machine learning process to run the neural network using a simulated control sequence as input and receiving a simulated demand curve as output; computing a cost function using the simulated demand curve and the desired demand curve; using the cost function to determine a new simulated control sequence; iteratively executing the performing, computing, and using steps until a goal state is reached; and determining that the new simulated control sequence is the time series control sequence upon the goal state being reached.

In embodiments, the demand curve is a time series of zone energy inputs.

In embodiments, computing the cost function further comprises determining difference between the desired demand curve and the simulated demand curve.

In embodiments, performing the machine learning process further comprises performing automatic differentiation backward through the neural network producing a new time series control sequence.

In embodiments, the goal state comprises the cost function being minimized, the neural network running for a specific time, or the neural network running a specific number of iterations.

In embodiments, the neural network comprises multiple activation functions within its nodes and wherein a multiple activation function has multiple variables that are passed between nodes.

In embodiments, a computer-readable storage medium configured with executable instructions to perform a method for creation of a demand curve upon receipt of a comfort curve, is disclosed, the method comprising: receiving a neural network of a plurality of controlled devices; receiving a desired demand curve; receiving a time series control sequence that comprises instructions to control the controllable device over time for at least one of the plurality of controlled building zones; performing a machine learning process to run the neural network using a simulated time series control sequence as input and receiving a simulated demand curve as output; computing a cost function using the simulated demand curve and the desired demand curve; using the cost function to determine a new simulated time series control sequence; iteratively executing the performing, computing, and using steps until a goal state is reached; and determining that the new simulated time series control sequence is the time series control sequence upon the goal state being reached.

Additional features and advantages will become apparent from the following detailed description of illustrated embodiments, which proceeds with reference to accompanying drawings.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
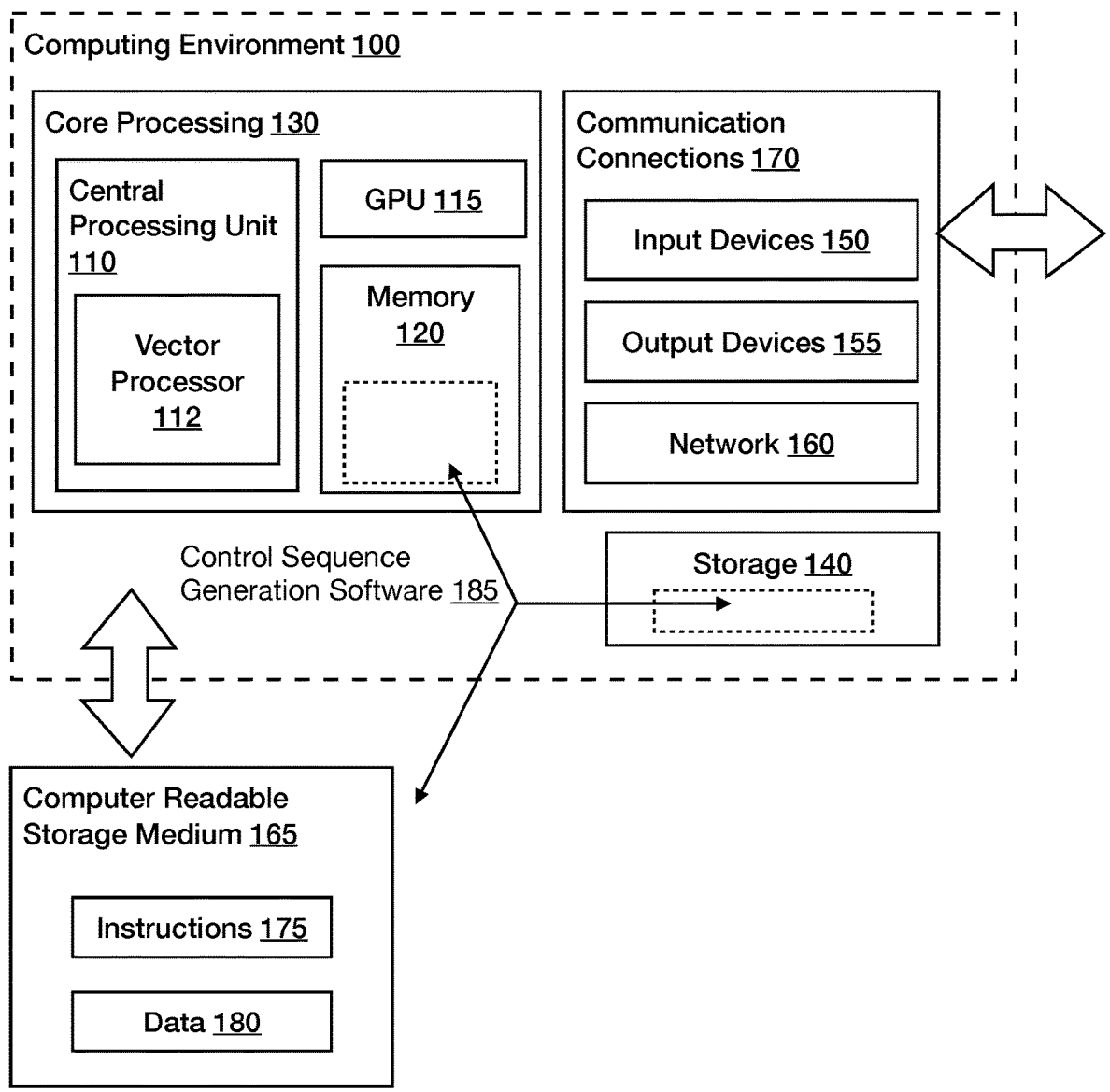
FIG. 1 is a functional block diagram showing an exemplary embodiment of a control sequence generation system in conjunction with which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to systems and methods for building neural networks that describe physical structures. Described embodiments implement one or more of the described technologies.

Various alternatives to the implementations described herein are possible. For example, embodiments described with reference to flowchart diagrams can be altered, such as, for example, by changing the ordering of stages shown in the flowcharts, or by repeating or omitting certain stages.

"Optimize" means to improve, not necessarily to perfect. For example, it may be possible to make further improvements in a value or an algorithm which has been optimized.

"Determine" means to get a good idea of, not necessarily to achieve the exact value. For example, it may be possible to make further improvements in a value or algorithm which has already been determined.

A "cost function," generally, compares the output of a simulation model with the ground truth a time curve that represents the answer the model is attempting to match. This gives us the cost the difference between simulated truth curve values and the expected values (the ground truth). The cost function may use a least squares function, a Mean Error (ME), Mean Squared Error (MSE), Mean Absolute Error (MAE), a Categorical Cross Entropy Cost Function, a Binary Cross Entropy Cost Function, and so on, to arrive at the answer. In some implementations, the cost function is a loss function. In some implementations, the cost function is a threshold, which may be a single number that indicates the simulated truth curve is close enough to the ground truth. In other implementations, the cost function may be a slope. The slope may also indicate that the simulated truth curve and the ground truth are of sufficient closeness. When a cost function is used, it may be time variant. It also may be linked to factors such as user preference, or changes in the physical model. The cost function applied to the simulation engine may comprise models of any one or more of the following: energy use, primary energy use, energy monetary cost, human comfort, the safety of building or building contents, the durability of building or building contents, microorganism growth potential, system equipment durability, system equipment longevity, environmental impact, and/or energy use $CO_2$ potential. The cost function may utilize a discount function based on discounted future value of a cost. In some embodiments, the discount function may devalue future energy as compared to current energy such that future uncertainty is accounted for, to ensure optimized operation over time. The discount function may devalue the future cost function of the control regimes, based on the accuracy or probability of the predicted weather data and/or on the value of the energy source on a utility pricing schedule, or the like.

A "goal state" may read in a cost (a value from a cost function) and determine if that cost meets criteria such that a goal has been reached. Such criteria may be the cost reaching a certain value, being higher or lower than a certain value, being between two values, etc. A goal state may also look at the time spent running the simulation model overall, if a running time has been reached, the neural network running a specific number of iterations, and so on.

A machine learning process is one of a variety of computer algorithms that improve automatically through experience. Common machine learning processes are Linear Regression, Logistic Regression, Decision Tree, Support Vector Machine (SVM), Naive Bayes, K-Nearest Neighbors (kNN), K-Means Clustering, Random Forest, Backpropagation with optimization, etc.

An "optimization method" is a method that takes a reverse gradient of a cost function with respect to an input of a neural network, and determines an input that more fully satisfies the cost function; that is, the new input leads to a lower cost, etc. Such optimization methods may include gradient descent, stochastic gradient descent, min-batch gradient descent, methods based on Newton's method, inversions of the Hessian using conjugate gradient techniques, Evolutionary computation such as Swarm Intelligence, Bee Colony optimization; SOMA, and Particle Swarm, etc. Non-linear optimization techniques, and other methods known by those of skill in the art may also be used.

In some machine learning techniques, backpropagation may be performed by automatic differentiation, or by a different method to determine partial derivatives of the node values within a neural network.

A "state" as used herein may be Air Temperature, Radiant Temperature, Atmospheric Pressure, Sound Pressure, Occupancy Amount, Indoor Air Quality, $CO_2$ concentration, Light Intensity, or another state that can be measured and controlled.

I. Overview

Artificial neural networks are powerful tools that have changed the nature of the world around us, leading to breakthroughs in classification problems, such as image and object recognition, voice generation and recognition, autonomous vehicle creation and new medical technologies, to name just a few. However, neural networks start from ground zero with no training. Training itself can be very onerous, both in that an appropriate training set must be assembled, and that the training often takes a very long time. For example, a neural network can be trained for human faces, but if the training set is not perfectly balanced between the many types of faces that exist, even after extensive training, it may still fail for a specific subset; at best, the answer is probabilistic; with the highest probability being considered the answer.

Existing approaches offer three steps to develop a deep learning AI model. The first step builds the structure of a neural network through defining the number of layers, number of nodes in each layer, and determines the activation function that will be used for the neural network. The second step determines what training data will work for the given problem, and locates such training data. The third step attempts to optimize the structure of the model, using the training data, through checking the difference between the output of the neural network and the desired output. The network then uses an iterative procedure to determine how to adjust the weights to more closely approach the desired output. Exploiting this methodology is cumbersome, at least because training the model is laborious.

Once the neural network is trained, it is basically a black box, composed of input, output, and hidden layers. The hidden layers are well and truly hidden, with no information that can be gleaned from them outside of the neural network itself. Thus, to answer a slightly different question, a new neural network, with a new training set must be developed, and all the computing power and time that is required to train a neural network must be employed.

We describe herein a way to use a neural network to determine optimal control states for equipment (on, off, running at some intermediate value) within a physical space when given the energy input amounts needed for various zones within the state zone energy inputs, or demand curves. "Physical space" should be understood broadly it can be a building, several buildings, buildings and grounds around it, a defined outside space, such as a garden or an irrigated field, etc. A portion of a building may be used as well. For example, a floor of a building may be used, a random section of a building, a room in a building, etc. This may be a space that currently exists, or may be a space that exists only as a design. Other choices are possible as well.

The physical space may be divided into zones. Different zones may have different sets of requirements for the amount of state needed in the zone to achieve the desired values. For example, for the state "temperature," a user Chris may like their office at 72° from 8 am-5 pm, while a user Avery may prefer their office at 77° from 6 am-4 pm. These preferences can be turned into comfort curves, which are a chronological (time-based) state curve. Chris's office comfort curve may be 68° from Midnight to 8 am, 72° from 8 am to 5 pm, then 68° from 5 pm to midnight. The comfort curves (for a designated space, such as Chris's office), are then used to calculate demand curves, which are the amount of state that may be input into the associated zones to achieve the state desired over time. For Chris's office, that is the amount of heat (or cold) that may be pumped into their office for the 24 hour time period covered by the comfort curve, that is, a zone energy input. These zones are controlled by one or more equipment pieces, allowing state in the space to be changed. Such zones may be referred to as controlled building zones.

Once we have one or more demand curves, we then run an equipment neural network model forward with a control sequence as input to determine demand output for that demand curve. That is, when we run equipment at various times in a structure, the structure, in turn, has some amount of state over time. This can be thought of as running a furnace from time T to time T+20, and from time T+120 to time T+145 in a structure with two zones. The heat propagates through both zones in the neural network which includes the walls, the air, etc, and diffuses. The model outputs the amount of heat, in this case, from time T to time T+240 in both zones, giving us two demand curves. We then check the demand curve output with the desired "ground truth" demand curve using a cost function, and then machine learning curves are used to tune the input values to create a new control sequence (or sequences). In some embodiments, a gradient of the cost function is calculated through backpropagation to the input (e.g, a resource), and then optimized by, e.g., a type of gradient descent, etc., giving us a new control curve to try. This is repeated until a goal state is reached. The last control sequence run is the control sequence that is then used to determine optimal equipment operation.

The neural networks disclosed herein have potentially different activation functions that may be equations that model different resources. For example, a pump will be described by different equations than a motor, a boiler, a heating coil, etc.

II. Computing Environment

FIG. 1 illustrates a generalized example of a suitable computing environment 100 in which described embodiments may be implemented. The computing environment 100 is not intended to suggest any limitation as to scope of use or functionality of the disclosure, as the present disclosure may be implemented in diverse general-purpose or special-purpose computing environments.

With reference to FIG. 1, the core processing is indicated by the core processing 130 box. The core processing 130 includes at least one central processing unit 110 and memory 120. The central processing unit 110 executes computer-executable instructions and may be a real or a virtual processor. It may also comprise a vector processor 112, which allows same-length node strings to be processed rapidly. In a multi-processing system, multiple processing units execute computer-executable instructions to increase processing power and as such the vector processor 112, GPU 115, and CPU can be running simultaneously. The memory 120 may be volatile memory (e.g., registers, cache, RAM), non-volatile memory (e.g., ROM, EEPROM, flash memory, etc.), or some combination of the two. The memory 120 stores software 185 implementing the described methods of generating control sequences.

A computing environment may have additional features. For example, the computing environment 100 includes storage 140, one or more input devices 150, one or more output devices 155, one or more network connections (e.g., wired, wireless, etc.) 160 as well as other communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. The computing system may also be distributed; running portions of the control sequence generation software 185 on different CPUs.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The storage 140 may be removable or non-removable, and includes magnetic disks, magnetic tapes or cassettes, CD-ROMs, CD-RWs, DVDs, flash drives, or any other medium which can be used to store information and which can be accessed within the computing environment 100. The storage 140 stores instructions for the software, such as control sequence generation software 185 to implement methods of node discretization and creation.

The input device(s) 150 may be a device that allows a user or another device to communicate with the computing environment 100, such as a touch input device such as a keyboard, video camera, a microphone, mouse, pen, or trackball, and a scanning device, touchscreen, or another device that provides input to the computing environment 100. For audio, the input device(s) 150 may be a sound card or similar device that accepts audio input in analog or digital form, or a CD-ROM reader that provides audio samples to the computing environment. The output device(s) 155 may be a display, printer, speaker, CD-writer, or another device that provides output from the computing environment 100.

The communication connection(s) 170 enable communication over a communication medium to another computing entity. The communication medium conveys information such as computer-executable instructions, compressed graphics information, or other data in a modulated data signal. Communication connections 170 may comprise input devices 150, output devices 155, and input/output devices that allows a client device to communicate with another device over network 160. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 160 may be a combination of multiple different kinds of wired or wireless networks. The network 160 may be a distributed network, with multiple computers, which might be building controllers, acting in tandem. A computing connection 170 may be a portable communications device such as a wireless handheld device, a cell phone device, and so on.

Computer-readable media are any available non-transient tangible media that can be accessed within a computing environment. By way of example, and not limitation, with the computing environment 100, computer-readable media include memory 120, storage 140, communication media, and combinations of any of the above. Computer readable storage media 165 which may be used to store computer readable media comprises instructions 175 and data 180. Data Sources may be computing devices, such as general hardware platform servers configured to receive and transmit information over the communications connections 170. The computing environment 100 may be an electrical controller that is directly connected to various resources, such as HVAC resources, and which has CPU 110, a GPU 115, Memory, 120, input devices 150, communication connections 170, and/or other features shown in the computing environment 100. The computing environment 100 may be a series of distributed computers. These distributed computers may comprise a series of connected electrical controllers.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

Figure 2:
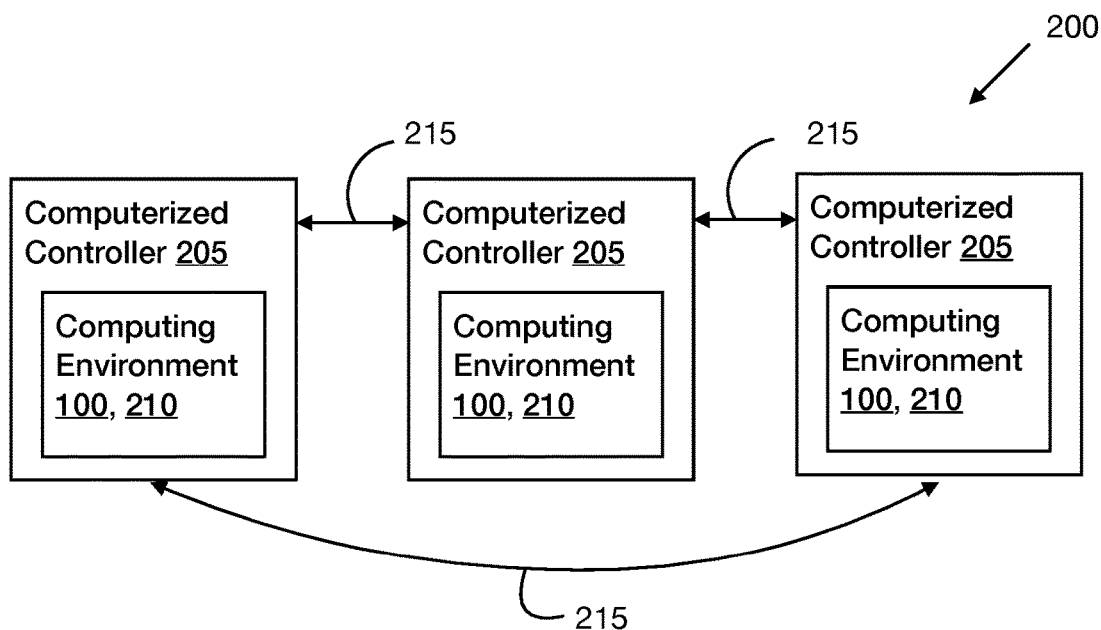
FIG. 2 is a block diagram of an exemplary computing environment in conjunction with which described embodiments can be implemented.

FIG. 2 depicts a distributed computing system with which embodiments disclosed herein may be implemented. Two or more computerized controllers 205 may comprise all or part of a computing environment 100, 210. These computerized controllers 205 may be connected 215 to each other using wired or wireless connections 215. These computerized controllers may comprise a distributed system that can run without using connections (such as internet connections) outside of the computing system 200 itself. This allows the system to run with low latency, and with other benefits of edge computing systems.

Figure 3:
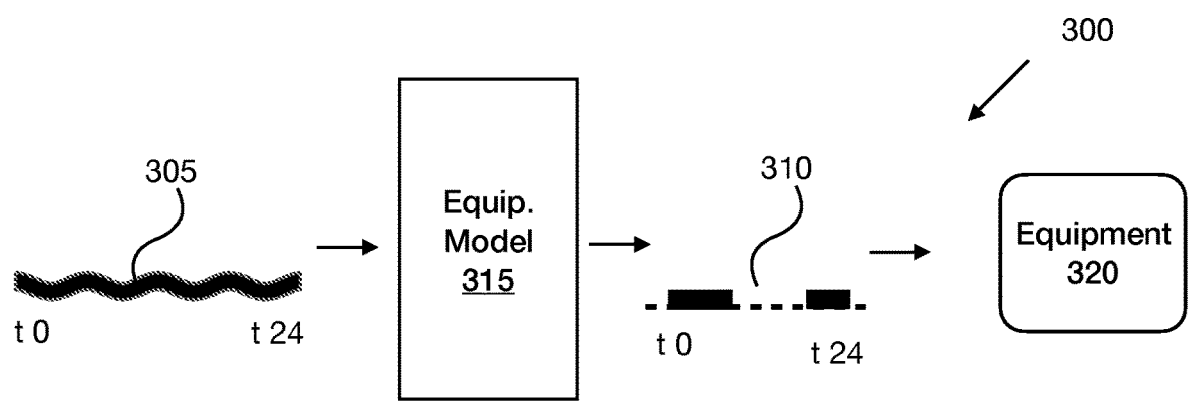
FIG. 3 depicts a system that determines control sequence curves from demand curves with which described embodiments can be implemented.

FIG. 3 discloses a system 300 that determines control sequence curves from demand curves. In an exemplary environment, a control sequence generation system comprises inputting a demand curve 305 (that is, state needs, such as desired temperature over time) into a neural network equipment model 315. Using machine learning techniques, the equipment model 315 produces a control state sequence 310 that gives control sequences that can then be used by controllable equipment 320. This may produce the desired amount of state (as represented by the original demand curve) in a given space.

III. Exemplary Method Embodiment

Figure 4:
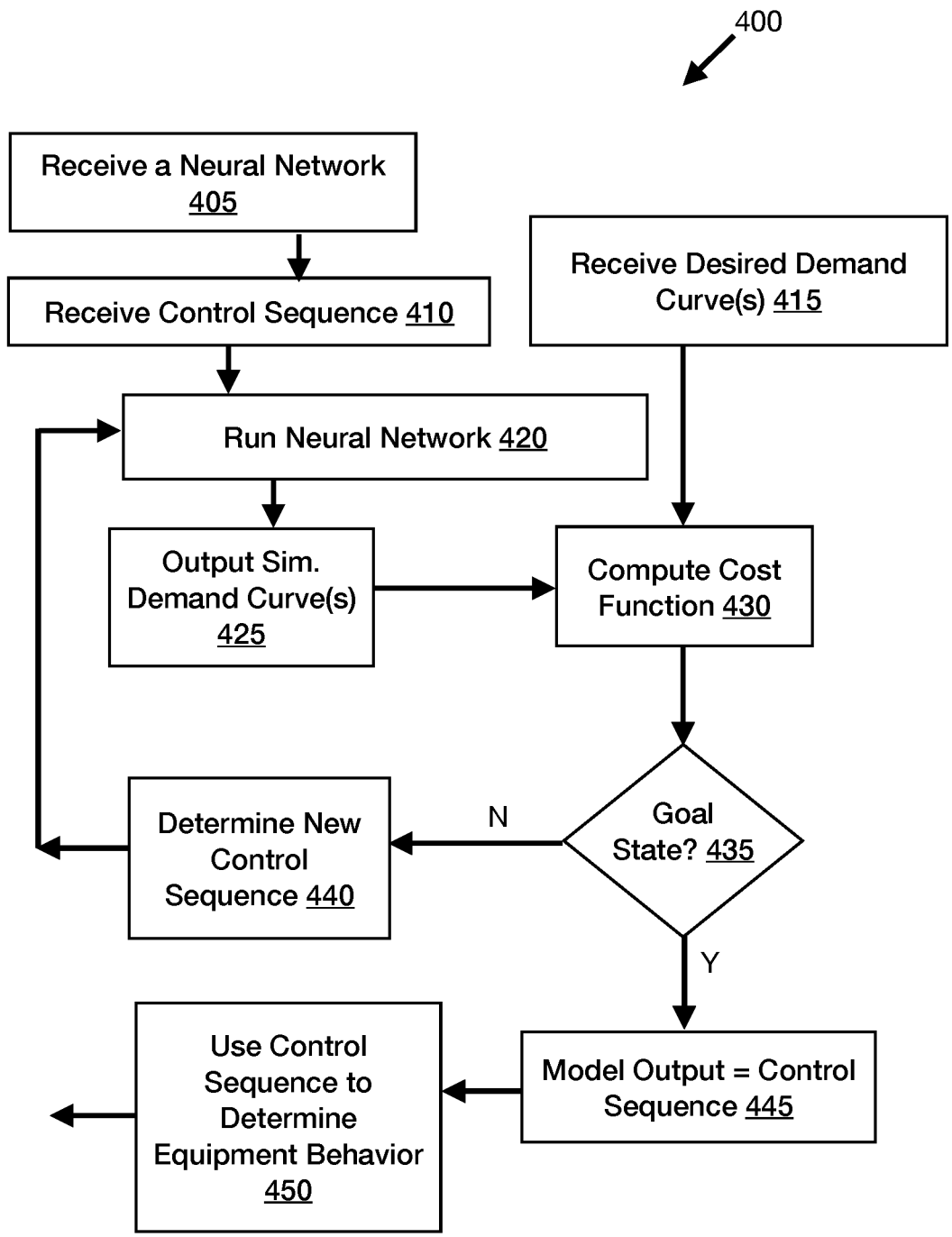
FIG. 4 is a flow diagram showing an exemplary embodiment of a method to determine control sequences from demand curves with which described embodiments can be implemented.

FIG. 4 depicts one method 400 for control sequence generation. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting. In some embodiments, method 400 may be implemented in one or more processing devices (e.g., a distributed system, a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 405, a neural network of a plurality of controlled devices is received. The neural network model may have been stored in memory, and so may be received from the processing device that the model is being run on. In some implementations, the neural network model may be stored within a distributed system, and received from more than one processor within the distributed system, etc. A controlled device is a device that has controls, such as on-off switches, motors, variable controls, etc. such that a computer can modify its behavior. These controls may be wired, wireless, etc.

In some embodiments described herein, in a neural network, the fundamentals of physics are utilized to model single components or pieces of equipment on a one-to-one basis with neural network nodes. Some nodes use physics equations as activation functions. Different types of nodes may have different equations for their activation functions, such that a neural network may have multiple activation functions within its nodes. When multiple components are linked to each other in a schematic diagram, a neural network is created that models the components as nodes. The values between the objects flow between the nodes as weights of connected edges. These neural networks may model not only the real complexities of systems but also their emergent behavior and the system semantics. Therefore, they may bypass two major steps of the conventional AI modeling approaches: determining the shape of the neural net, and training the neural network from scratch.

As the nodes are arranged in order of an actual system (or set of equations) and because the nodes themselves comprise an equation or a series of equations that describe the function of their associated object, and certain relationships between them are determined by their location in the neural net, a huge portion of training is no longer necessary, as the neural network itself comprises location information, behavior information, and interaction information between the different objects represented by the nodes. Further, the values held by nodes in the neural network at given times represent real-world behavior of the objects so represented. The neural network is no longer a black box but itself contains important information. This neural network structure also provides much deeper information about the systems and objects being described. Since the neural network is physics- and location-based, unlike the conventional AI structures, it is not limited to a specific model, but can run multiple models for the system that the neural network represents without requiring separate creation or training.

In some embodiments, the neural network that is described herein chooses the location of the nodes to tell you something about the physical nature of the system. The nodes are arranged in a way that references the locations of actual objects in the real work. The neural network also may use actual equations that can be used to determine object behavior into the activation function of the node. The weights that move between nodes are equation variables. Different nodes may have unrelated activation functions, depending on the nature of the model being represented. In an exemplary embodiment, each activation function in a neural network may be different.

As an exemplary embodiment, a pump could be represented in a neural network as a network node with multiple variables (weights on edges), some variables that represent efficiency, energy consumption, pressure, etc. The nodes will be placed such that one set of weights (variables) feeds into the next node (e.g., with equation(s) as its activation function) that uses those variables. Unlike other types of neural networks, two required steps in earlier neural network versions-shaping the neural net, and training the model—may already be performed. Using embodiments discussed herein the neural network model need not be trained on some subset of information that is already known. In some embodiments, the individual nodes represent physical representations. Individual nodes may hold parameter values that help define the physical representation. As such, when the neural network is run, the parameters helping define the physical representation can be tweaked to more accurately represent the given physical representation.

This has the effect of pre-training the model with a qualitative set of guarantees, as the physics equations that describe objects being modeled are true, which saves having to find training sets and using huge amounts of computational time to run the training sets through the models to train them. A model does not need to be trained with information about the world that is already known. With objects connected in the neural network similar to how they are connected in the real world, emergent behavior arises in the model that, in certain cases, maps to the real world. This model behavior that is uncovered is often otherwise too computationally complex to determine. Further, the nodes represent actual objects, not just black boxes. The behavior of the nodes themselves can be examined to determine behavior of the object, and can also be used to refine the understanding of the object behavior. One example of such heterogenous models is described in U.S. patent application Ser. No. 17/143,796, filed on Jan. 7, 2021, which is incorporated herein in its entirety by reference.

At operation 410, a simulated control sequence is received. Initially, the values of the control sequence curve may be random, may be a control sequence from another similar model run, etc. The control curve comprises instructions to control one or more controllable devices over time for at least one of the plurality of controlled building zones that are modeled by the neural network. As a brief overview, in an illustrative embodiment, we have the demand curves we want zones (e.g., areas) to conform to, such as Chris's office, as described above, and we wish to find the control sequences (i.e., how to run the equipment) time to meet the state amount indicated by the demand curve. To do so, we use simulated control curves that control (simulated) equipment by turning it on, off, and set them to intermediate values, etc. as input in the model, run the model which outputs the simulated comfort curve for the given demand curve.

Figure 5:
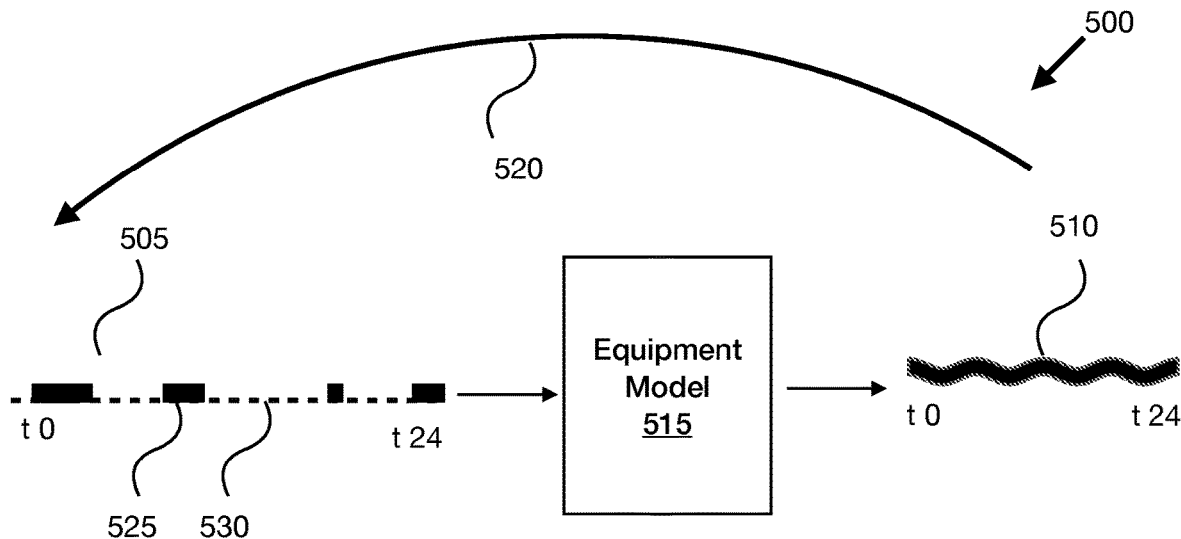
FIG. 5 is a diagram showing a high level exemplary embodiment of the input and output of a neural network model with which described embodiments can be implemented.

FIG. 5 is a diagram 500 showing an high level exemplary embodiment of the input and output of a neural network model. With reference to FIG. 5, this entails using a control sequence (e.g., equipment behavior over time t0 to t24) as input into an equipment model 515. The equipment model runs forward and produces a simulated demand curve 510 for the same time period (t0 to t24) as the control sequence. A new control sequence is determined and then fed back 520 into the model 515, until a suitable simulated demand curve is created. This entails the simulated demand curve being sufficiently close to the desired demand curve.

At operation 420, a machine learning process is performed to run the neural network using a simulated control sequence as input and receiving the simulated demand curve 425 as output. Running the model may entail feedforward running the control sequence though the model to the outputs over time T(0)-T(n), capturing state output values within neurons that represent resources that modify state- over the same time T(0)-T(n). At operation 425, simulated demand curve(s) are output. In some embodiments, the demand curve is output 425 successively in timesteps during the model run, or other methods are used. The first time the neural network is run, a control sequence 410 may be supplied. This initial control sequence may be determined randomly, or another method may be used, such as a control sequence stored previously that was used as the solution to a similar demand curve problem.

At operation 415, the desired demand curve(s) are received. These are the curves that describe the amount of state that is needed over time. These may also be called ground truth demand curves. Ground truth is the information provided by direct evidence or is the desired output from the neural network.

At operation 430, a cost function is computed using the time series of desired comfort curve(s) and the model output a simulated demand curve. The cost function measures the difference between the time series of desired demand curve (s) 415 and the simulated demand curve(s) output 425 from the neural network 420. Details of the cost function are described elsewhere.

At operation 435, a goal state is checked to determine if a stopping state has been reached. The goal state may be that the cost from the cost function is within a certain value, that the program has run for a given time, that the model has run for a given number of iterations, that the model has run for a given time, that a threshold value has been reached, such as the cost function should be equal or lower than the threshold value, or a different criterion may be used. If the goal state has not been reached, then a new set of inputs needs to be determined that are incrementally closer to an eventual answer a lowest (or highest or otherwise determined) value for the cost function, as described elsewhere.

At operation 445, if the goal state 435 has determined that a stopping state been reached, then the control sequence that was used for the last heterogenous model run is set as the solved control sequence; that is, the control sequence that will meet the requirements for the desired demand curve, within some range. This method can save as much as 30% of energy costs over adjusting the state when the need arises. If the goal state has not been reached, then the determine new control sequence step 440, the run neural network step 420, the output simulation demand curve step 425, and compute cost function state 430 are iteratively performed, which incrementally optimizes the demand curve until the goal state 435 is reached.

In some implementations, once the control sequence has been determined 445, it can then be used to run the equipment that is associated with the equipment modeled in the neural network. Controlling equipment in such a predetermined fashion can save greatly on energy costs, as well as more accurately controlling state in a defined space for the people and objects therein.

At operation 440 new simulated control sequences are determined for the next run of the neural network. This may be performed using the cost function; by using machine learning algorithms, etc. In some embodiments, backpropagation is used to determine a gradient of the cost function in relation to the various values in the neural network. This gradient may then be used to optimize the control sequence for the next model run.

Figure 6:
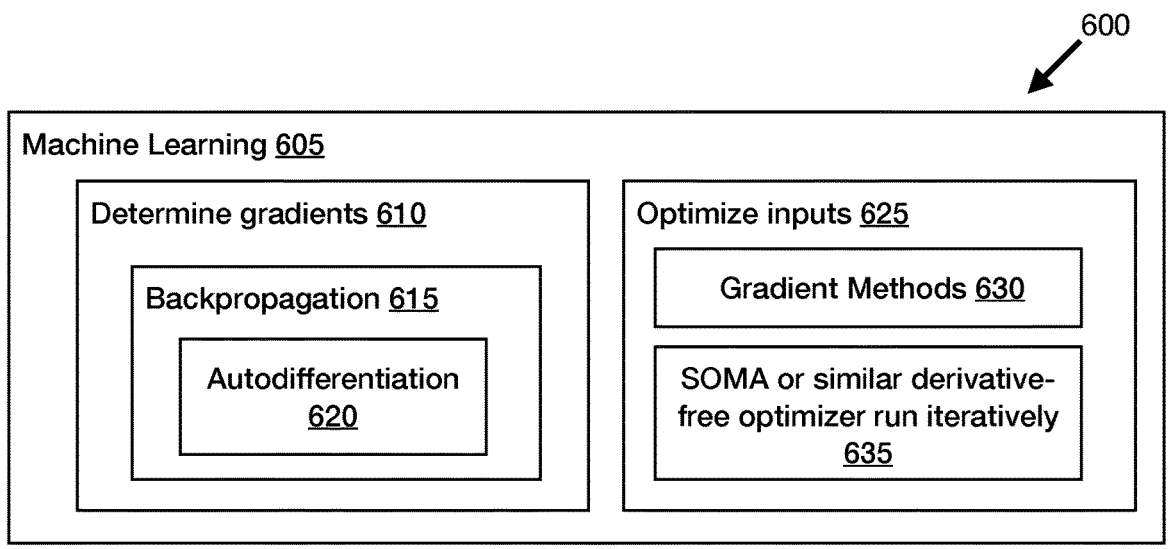
FIG. 6 is a functional block diagram showing different machine learning functions with which described embodiments can be implemented.

FIG. 6 is a functional block diagram 600 showing different machine learning functions. At operation 440, control sequences are determined. These control sequences may be determined by using machine learning 605. Machine learning techniques 605 may comprise determining gradients of the various variables within the neural network with respect to the cost function. Once the gradients are determined, gradient methods may be used to incrementally optimize the control sequences. The gradient at a location shows which way to move to minimize the cost function with respect to the inputs—i.e., the control sequences. In some embodiments, gradients of the internal variables with respect to the cost function are determined 610. In some embodiments, internal parameters of the nodes have their partial derivatives calculated, which gives the gradient. Different nodes may have different parameters. For example, a node modeling a pump may have parameters such as density, shaft speed, volume flow ratio, hydraulic power, etc. If the derivatives are differentiable, then backpropagation 615 can be used to determine the partial derivatives. Backpropagation finds the derivative of the error (given by the cost function) for the parameters in the neural network, that is, backpropagation computes the gradient of the cost function with respect to the parameters within the network. More specifically, backpropagation 615 calculates the derivative between the cost function and parameters by using the chain rule from the last neurons calculated during the feedforward propagation through the internal neurons, to the first neurons calculated—a backward pass; that is, taking the gradient of the thermodynamic model backward in relation to the cost. In some embodiments, backpropagation will be performed by automatic differentiation 620. According to Wikipedia, "automatic differentiation is accomplished by augmenting the algebra of real numbers and obtaining a new arithmetic. An additional component is added to every number to represent the derivative of a function at the number, and all arithmetic operators are extended for the augmented algebra." Other methods may be used to determine the parameter partial derivatives. These include Particle Swarm and SOMA (Self-Organizing Migrating Algorithm), etc. The backpropagation may work on a negative gradient of the cost function, as the negative gradient points in the direction of smaller values.

After the partial derivatives are determined, the control sequence is optimized 625 to lower the value of the cost function with respect to the inputs. This process is repeated incrementally. Many different optimizers may be used, which can be roughly grouped into 1) gradient descent methods 630 and 2) other methods 635. Among the gradient descent methods 630 are standard gradient descent, stochastic gradient descent, and mini-batch gradient descent. Among the other methods 635 are Momentum, Adagrad, AdaDelta, ADAM (adaptive movement estimation), and so on. Once a new sequence is determined, the neural network is run again 420.

Figure 7:
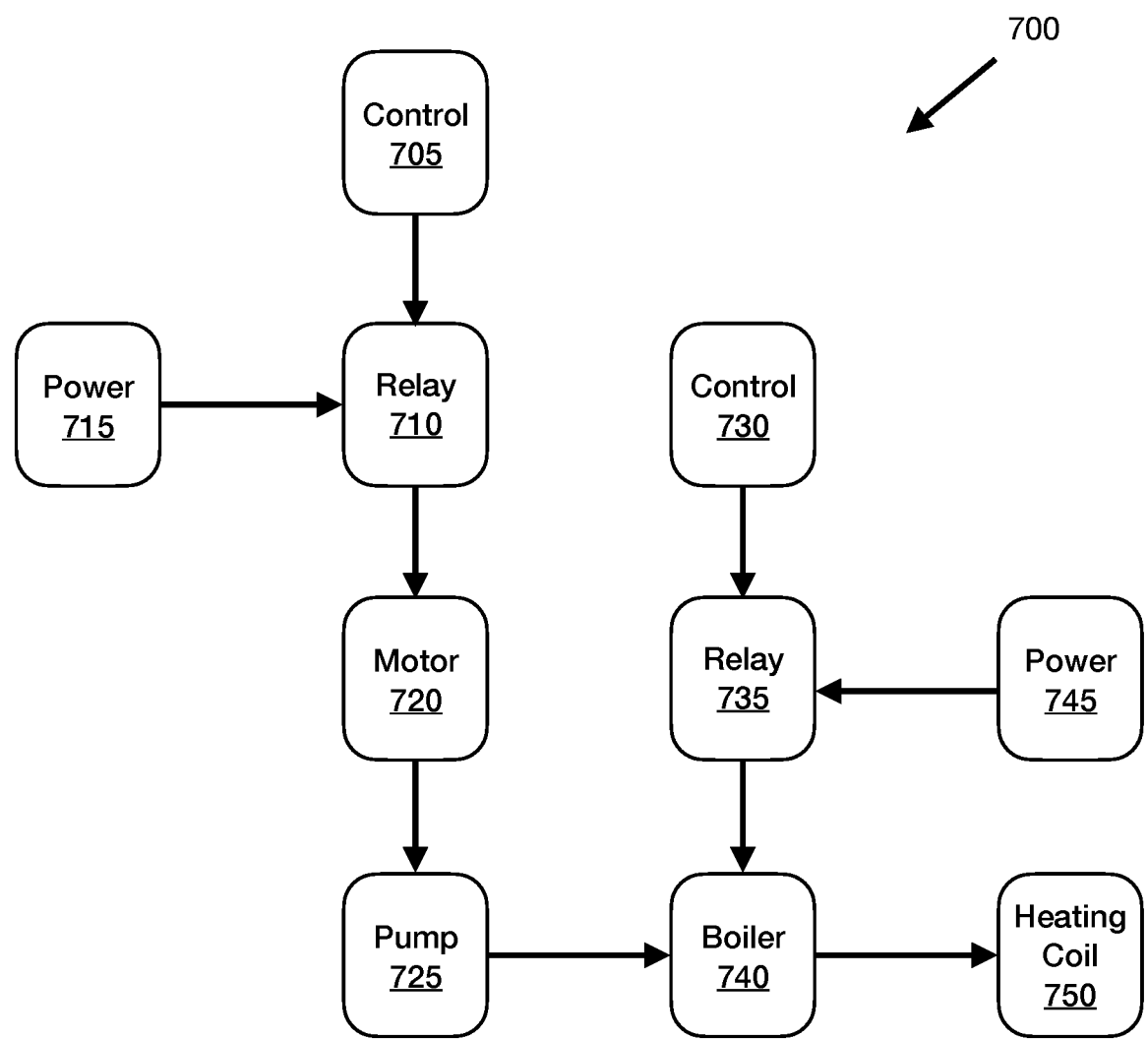
FIG. 7 depicts a physical system whose behavior can be determined by using a neural network with which described embodiments can be implemented.

FIG. 7 depicts a physical system 700 whose behavior can be determined by using a neural network. This physical system 700 comprises a simple heating system comprising a pump 725, a boiler 740, and a heating coil 750 that produces hot air. The pump itself comprises a control 705 to send a signal to turn the pump on to a relay 710, which then sends power to a motor 720, that drives a pump 725. The pump sends water to a boiler 740, which is likewise turned on by a control 730-relay 735 power 745 system. The boiler then sends hot water to a heating coil, which transforms the hot water into hot air.

Figure 8:
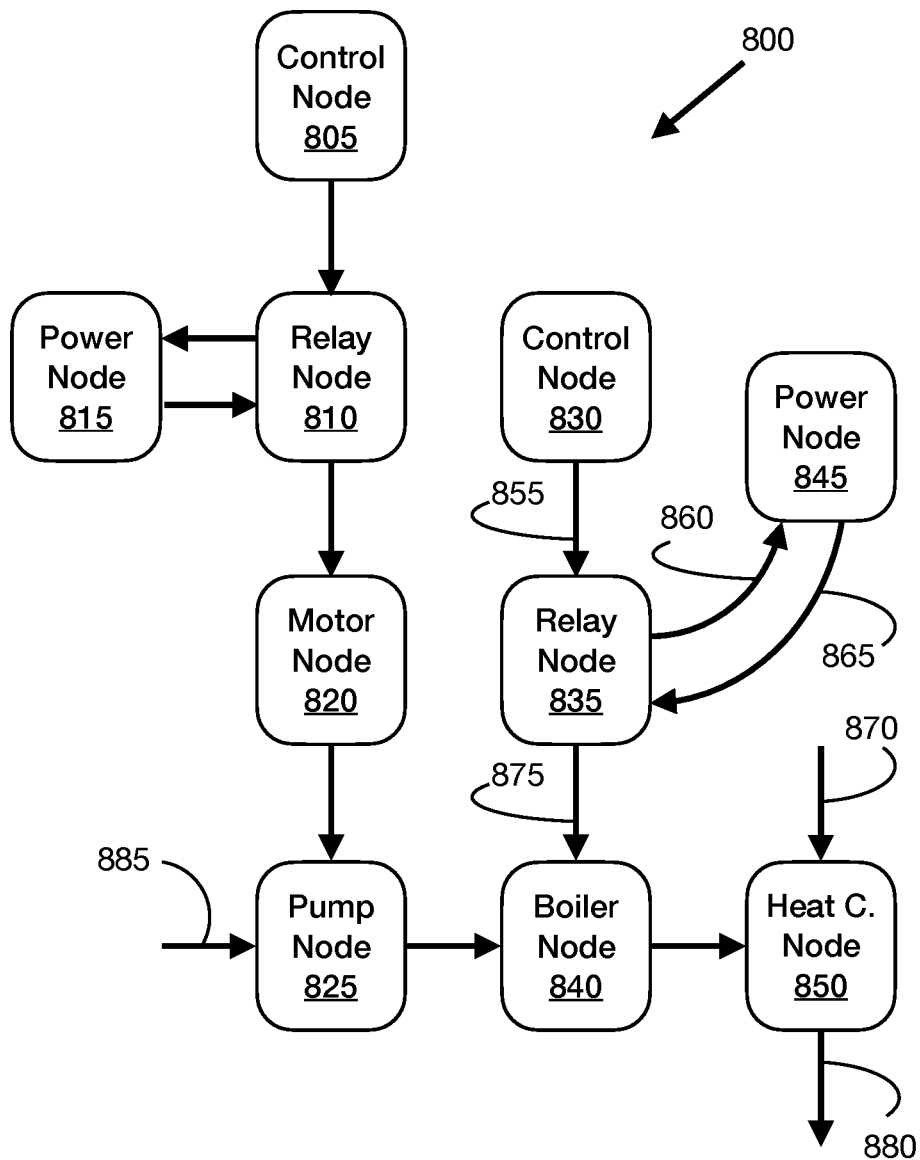
FIG. 8 depicts a neural network that may be used to model behaviors of the physical system of FIG. 7 with which described embodiments can be implemented.

FIG. 8 depicts a heterogenous neural network 800 that may be used to model behaviors of the physical system of FIG. 7. Nodes are placed in locations with reference to the physical equipment behavior, such that the control node 805 is connected to relay node 810, the relay node is connected to Power node 815. Relay node 810 is also connected to motor node 820 and pump node 825. When the control node 805 receives an input to turn on, that information is relayed through the relay node, which signals the power node to turn on and the motor node to turn on. These, in turn signal the pump node to turn on. The power node may, for example, send a voltage signal to the relay node, which may pass it on to the motor node. An activation function of the motor node may have associated with it a series of equations that take the signal from the relay node and turn it into mechanical rotation for the pump node 825 to use. The pump node 825 may also have a water input 885 with its own properties. Similarly, the control node 830, when input with an "on," or some other method to indicate an on action, will turn on the boiler node 840 through passing on an "on" 855 to a relay node 835, which then turns on the power node 840 through variables sent through edge 860. Power node 845 then passes electricity along edge 865 through the relay node 835 edge 875 to the boiler node 840 which then, e.g., uses variables from the pump node 825 and its own activation function equations that model its physics properties to do the the model equivalent of heating water. This, in turn, passes variables that heats up the heating coil node 850. Heating coil node 850 intakes air values along edge 870 and produces hot air values 880. The values 880 may be the simulated demand curve 440 for this model. In some embodiments, this system would produce a neural network that used two control sequences, one for control node 805, and one for control node 830. It would produce one demand curve, the output from the heating coil node 850.

In some implementations, some nodes within a neural network have many variables that are passed among the nodes, and have different (heterogenous) activation functions. For example, an exemplary boiler activation function may describe, using equations, the activation of a boiler, e.g., boiler node 840. This may be, in whole or in part: inputPower=inputVoltage*inputCurrent; PLR=inputPower/Nominal power; Resistance Resistance=f(Nominal pressure drop, Nominal flow rate); Efficiency=f(Efficiency coefficients, PLR, nominal temperature); Power=f(PLR, Efficiency, Full load efficiency, Capacity); specificEnthalpy=f (input specificEnthalpy, Power, fluid flow rate); Pressure drop=f(Flow, resistance); Pressure=Pressure−Pressure drop, and so forth.

Exemplary weight values in a neural network that might be used as variables in a activation node for a boiler may be: Nominal temperature; Nominal power; Full load efficiency; Nominal pressure drop; Nominal flow rate; inputPower=inputVoltage*inputCurrent; PLR=inputPower/Nominal power. These variables may arrive at the node through an edge from another node, or as an input. One node may send multiple variables to another node.

Exemplary equations to describe a pump that are used as an activation function in a node, e.g., pump node 825 may be: Volume flow rate=f(qFlow, density); Volume flow rate ratio=Volume flow rate/Max volume flow rate; Shaft speed ratio=qAngularVelocity/Max shaft speed; Pressure head=pressure curve (Volume flow rate, shaft speed ratio, and so forth.

Exemplary weight values in a neural network that might be used as variables in an activation node for e.g., a pump may be: Properties Pressure curve points; Power curve points, Efficiency curve points, Max volume flow rate, Max pressure head, Max shaft speed, and so forth.

IV. Exemplary System Embodiment

Figure 9:
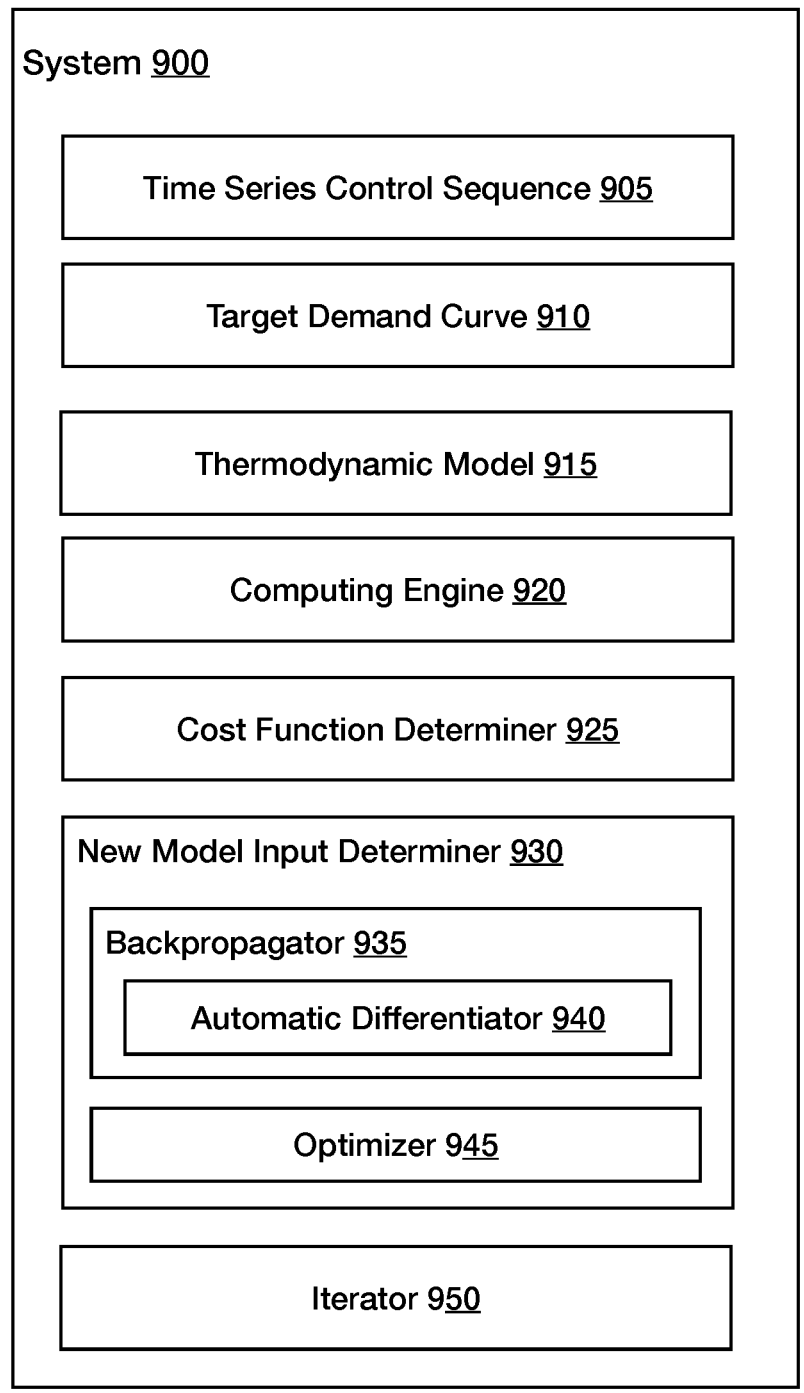
FIG. 9 is a block diagram showing an exemplary embodiment of a system to determine control sequences from demand curves with which described embodiments can be implemented.

FIG. 9 depicts one system 900 for control sequence generation. The system may include a computer environment 100. The system includes a time series control sequence 905 that comprises instructions to control a controllable device over time. Initially, the values of the control sequence may be random, may be a time series control sequence from another similar model run, etc. A target demand curve 910 that comprises amount of state in a location over time is also included. As described with reference to FIG. 5, a time series control sequence 505 is used as input. The pictured control sequence describes a piece of equipment turning on 525 and off 530 over time. Different types of equipment may have intermediate values and other sorts of values that are also indicated in a control sequence. A target demand curve 910 is also included. A target demand curve 910 is the ground truth value that the model is trying to match. This demand curve is the amount of state over time that should be in a space associated with the model, a space associated with a portion of the model (sometimes called zones), etc.

A thermodynamic model 915 is used that models the equipment that is to be used (or is being used) in a space. Examples of such models are shown with reference to FIG. 7 and FIG. 8. The model is a thermodynamic model because it incorporates thermodynamic qualities of objects in the model by way of the activation functions. The thermodynamic model may be a heterogenous physics network; heterogenous as the activation functions of the nodes may be different, as different resources behave differently. This may include nodes that are thermodynamic representations of equipment or portions of equipment. They may be thermodynamic representations by being associated with equations that model thermodynamic behavior of the equipment/portions of equipment.

A computing engine 920 runs the thermodynamic model using the time series control sequence as input, and outputs a simulated demand curve. With reference to FIGS. 5 and 8, in some embodiments, a computing engine 920 runs the thermodynamic model by inputting a control sequence over time 505, and running the values through the model, eg., according to the arrows shown in FIG. 8. The model then outputs a demand curve 880. A cost function determiner 925 compares difference between the simulated demand curve and the target demand curve producing a cost. This cost is a performance metric describes how close the simulated demand curve is to the target demand curve.

A new model input determiner 930 determines a new time series control sequence that should give an output demand curve with a lower cost, that is closer to the target demand curve. The new model input determiner 930 may use a backpropagator 935 to help determine the new time series control sequence. This backpropagator may use an automatic differentiator 940 to determine gradients of the various variables (weights, values, etc.) with the thermodynamic model. This may produce the negative gradient of the cost function for the weights and/or variables used in the cost functions; examples of which can be seen above. Once the negative gradients are determined, then an optimizer 945 can use the negative gradients to incrementally change the time series control sequence such that the thermodynamic model output more closely approaches the target demand curve 910. As described with reference to FIG. 6, the optimizer may optimize inputs use gradient methods 630 or other methods. An iterator 950 runs the thermodynamic model 915 using the computing engine 920. It then uses the cost function determiner to determine how close the simulated demand curve computed by the computing engine is to the target demand curve. If a goal function has been met, e.g., if the two curves are close enough, if a certain number of iterations have been run, if the model has run for a certain time, etc., then the iterator quits, and the last determined time series control sequence is considered the control sequence shown in FIG. 3 at 310 that is output from the larger model. If a goal function has not been met, then the iterator runs the thermodynamic model 915 using the computing engine 920 until the cost function determiner determines that the goal state has been met. Once a control sequence has been generated, it may be used to control equipment that was modeled.

Cost functions can minimize many different aspects of a thermodynamic model by which variables are viewed when calculating the cost. For example a cost function determiner may comprise a cost function which looks at variables within the neural network to minimize short cycling frequency by calculating a cost based on, e.g., length of cycles. Other cost functions may minimize a next time series control sequence of operation error, a next time series output path error, an energy cost, a state cost, a frequency of sequence changes, a equipment life cost, a comfort value, etc.

Figure 10:
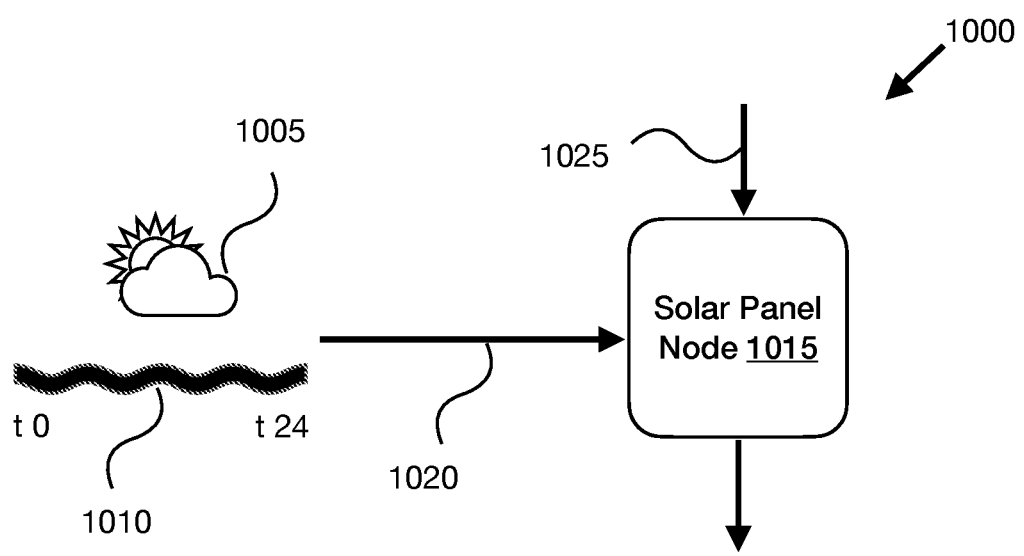
FIG. 10 depicts a node system that has multiple inputs with which described embodiments can be implemented.

FIG. 10 discloses a node system 1000 that has multiple inputs. A node may be affected by other forces not directly built into the thermodynamic model. For example, the value of a solar panel node 1015 may depend, at least partly, on the weather 1005, the orientation, the time of year, etc. These forces may be included in the thermodynamic model as a time series curve input 1010 that models the outside influence as a state curve with values over a series of time steps. These values may then be incorporated into a node 1015 as a direct input 1020, as feed forward value from one node to another 1025, or incorporated in a different method.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for controlling a controlled system having a plurality of controlled devices, the method comprising:
    calculating a demand value representing at least one target outcome from the controlled system using a first neural network, the first neural network having a plurality of nodes, wherein at least two nodes represent at least two corresponding controlled devices in the controlled system;
    creating a cost function that compares the demand value to simulated outcome values produced by the first neural network, and which takes as input respective sets of control actions issuable to the plurality of controlled devices;
    performing an optimization method that tunes a candidate set of control actions to reduce a cost output by the cost function based on the candidate set of control actions; and
    issuing control actions of the candidate set of control actions to the respective ones of the plurality of controlled devices to cause the controlled system to adjust an environmental state of an area associated with the controlled system.

2. The method of claim 1, wherein performing the optimization method comprises:
    computing partial derivatives using the first neural network; and
    using the partial derivatives to perform gradient descent to tune the candidate set of control actions.

3. The method of claim 2, wherein performing gradient descent comprises:
    randomly generating the candidate set of control actions; and
    iteratively tuning the candidate set of control actions according to the partial derivatives to reduce a cost indicated by the cost function.

4. The method of claim 1, wherein the demand value is a demand curve representing variance in the at least one target outcome over a period of time.

5. The method of claim 1, wherein:
    calculating a demand value comprises calculating a plurality of demand values corresponding to a plurality of desired outcomes, respectively; and in comparing the demand value to simulated outcome values produced by the first neural network, the cost function compares the plurality of demand values to a plurality of simulated outcome values produced by the first neural network, respectively.

6. The method of claim 1, wherein the optimization method that tunes a candidate set of control actions to reduce a cost output by the cost function based on the candidate set of control actions comprises a method that runs a neural network, the neural network comprising nodes that correlate to controlled devices.

7. A device for controlling a controlled system having a plurality of controlled devices, comprising:
a communication interface configured to communicate with the plurality of controlled devices;
a memory comprising a model of the controlled system; and
a processor configured to:
calculate a demand curve for a controlled space representing at least one target amount of state for delivery to the controlled space using a first neural network, the first neural network having a plurality of nodes, wherein at least two nodes represent at least two corresponding controlled devices,
create a cost function that compares the demand curve to simulated state curves produced by the first neural network, and which takes as input respective sets of control actions issuable to the plurality of controlled devices,
perform an optimization method that tunes a candidate set of control actions to reduce a cost output by the cost function based on the candidate set of control actions, and
issue control actions of the candidate set of control actions to respective ones of the plurality of controlled devices to cause the controlled system to deliver an environmental state to the controlled space.

8. The device of claim 7, wherein, in performing the optimization method, the processor is configured to:
compute partial derivatives using the model; and
use the partial derivatives to perform gradient descent to tune the candidate set of control actions.

9. The device of claim 8, wherein, in performing gradient descent, the processor is configured to:
randomly generate the candidate set of control actions; and
iteratively tune the candidate set of control actions according to the partial derivatives to reduce a cost indicated by the cost function.

10. The device of claim 7, wherein, in calculating a demand curve, the processor is configured to calculate the demand curve as at least one target amount of state for delivery to the controlled space to achieve a comfort curve representing a desired state for the controlled space.

11. The device of claim 7, wherein:
the controlled space comprises a plurality of zones;
in calculating a demand curve, the processor is configured to calculate a plurality of demand curves corresponding to the plurality of zones, respectively; and
in comparing the demand curve to simulated state curves produced by the model, the cost function compares the plurality of demand curves to a plurality of simulated state curves produced by the model corresponding to the plurality of zones, respectively.

12. A non-transitory computer-readable storage medium configured with instructions executable by a processor for controlling a controlled system having a plurality of controlled devices, the non-transitory computer-readable storage medium comprising:
instructions for calculating a demand value representing at least one target outcome from the controlled system using a first neural network, the first neural network having a plurality of nodes, wherein at least two nodes represent at least two corresponding controlled devices;
instructions for creating a cost function that compares the demand value to simulated outcome values produced by the first neural network, which takes as input respective sets of control actions issuable to the plurality of controlled devices;
instructions for performing an optimization method that tunes a candidate set of control actions to reduce a cost output by the cost function based on the candidate set of control actions; and
instructions for issuing control actions of the candidate set of control actions to respective ones of the plurality of controlled devices to cause the controlled system to adjust an environmental state of an area associated with the controlled system.

13. The non-transitory computer-readable storage medium of claim 12, wherein performing the optimization method comprises:
instructions for computing partial derivatives using the first neural network; and
instructions for using the partial derivatives to perform gradient descent to tune the candidate set of control actions.

14. The non-transitory computer-readable storage medium of claim 13, wherein performing gradient descent comprises:
instructions for randomly generating the candidate set of control actions; and
instructions for iteratively tuning the candidate set of control actions according to the partial derivatives to reduce a cost indicated by the cost function.

15. The non-transitory computer-readable storage medium of claim 12, wherein the demand value is a demand curve representing variance in the at least one target outcome over a period of time.

16. The non-transitory computer-readable storage medium of claim 12, wherein:
instructions for calculating a demand value comprises instructions for calculating a plurality of demand values corresponding to a plurality of desired outcomes, respectively; and
in comparing the demand value to simulated outcome values produced by the first neural network, the cost function compares the plurality of demand values to a plurality of simulated outcome values produced by the first neural network, respectively.

17. The non-transitory computer-readable storage medium of claim 12, wherein the optimization method that tunes a candidate set of control actions to reduce a cost output by the cost function based on the candidate set of control actions comprises a method that runs a neural network.

18. The non-transitory computer-readable storage medium of claim 17, wherein the neural network comprises nodes that represent the plurality of controlled devices such that each device is represented by a node.

19. The non-transitory computer-readable storage medium of claim 18, wherein at least two of the nodes are arranged in the neural network corresponding to their equivalent controlled device.

20. The non-transitory computer-readable storage medium of claim 19, wherein at least two nodes have different activation functions, and wherein at least one activation function has multiple variables.

* * * * *